JOSEPH F. SEBALD
IGOR J. KARASSIK
INVENTORS

Sept. 5, 1967  J. F. SEBALD ET AL  3,339,345
HYDRAULIC AND PNEUMATIC FOAM COLLECTION, PICK-UP
AND COLLAPSE SYSTEM WITH CONCENTRATED
LIQUID RECIRCULATION
Filed Nov. 19, 1965  2 Sheets-Sheet 2

JOSEPH F. SEBALD
IGOR J. KARASSIK
*INVENTORS*

United States Patent Office 3,339,345
Patented Sept. 5, 1967

3,339,345
HYDRAULIC AND PNEUMATIC FOAM COLLECTION, PICK-UP AND COLLAPSE SYSTEM WITH CONCENTRATED LIQUID RECIRCULATION
Joseph F. Sebald, Bloomfield, and Igor J. Karassik, Maplewood, N.J., assignors to Worthington Corporation, Harrison, N.J., a corporation of Delaware
Filed Nov. 19, 1965, Ser. No. 508,675
9 Claims. (Cl. 55—178)

This invention relates to combined hydraulic and pneumatic means for collecting and removing foaming compounds from foaming column apparatus and, more particularly, to means as above for use in the collection and removal of foaming compounds, in the nature of surfactants, from liquids, in the nature of treated sewage and/or industrial waste or process liquids, from foaming column apparatus in which the same have been separated.

Problems in the operation of the foam collection and removal apparatus of the prior art which are used in the removal of foaming compounds from liquids reside primarily in the undue complexity and attendant high cost thereof, or in the generally unsatisfactory operational efficiencies thereof whereby, in the latter instance, the liquids discharged therefrom are not sufficiently foaming compound-free to enable the satisfactory re-use or discharge thereof to waste. It is accordingly a primary object of this invention to provide new and improved foaming compound collection and removal means for the collection and removal of foaming compounds from liquids, which are of particularly uncomplicated and inexpensive design and construction, and which function at sufficiently high operational efficiencies to enable the satisfactory re-use or discharge to waste of liquids treated thereby.

Another object of the invention is the provision of foaming compound collection and removal means as above which function in part through the use of weir means, and the recirculation of a portion of the liquid in which the foaming compounds have been concentrated by the foaming column, through the foaming column to enable further separational action thereon.

Another object of the present invention is the provision of means as above which include centrifugal blower means for foaming compound collapse and removal, and means for introducing a stream of secondary air to the said apparatus for use in transporting the foaming compounds, in the foam state, to the said centrifugal blower means.

A further object of the invention is the provision of means as above which include flushing means for enabling periodic, reverse fluid flow through the said centrifugal blower means to flush out foaming compound matter which may have been deposited on the internal surfaces of the latter.

Another object of the invention is the provision of means as above which, in a second embodiment thereof, include foam transport air recirculation means to in effect provide a closed transport air system to prevent freezing, confine odors and reduce operational noise levels.

A further object of the invention is the provision of foaming compound removal and collection means as above which are of particularly reliable design and construction, and which require the use of only readily available components of proven dependability, whereby long periods of satisfactory, maintenance free operation thereof are assured.

The above and other objects and advantages of the invention are believed made clear by the following detailed description thereof taken in conjunction with the accompanying drawings wherein.

Figure 1:
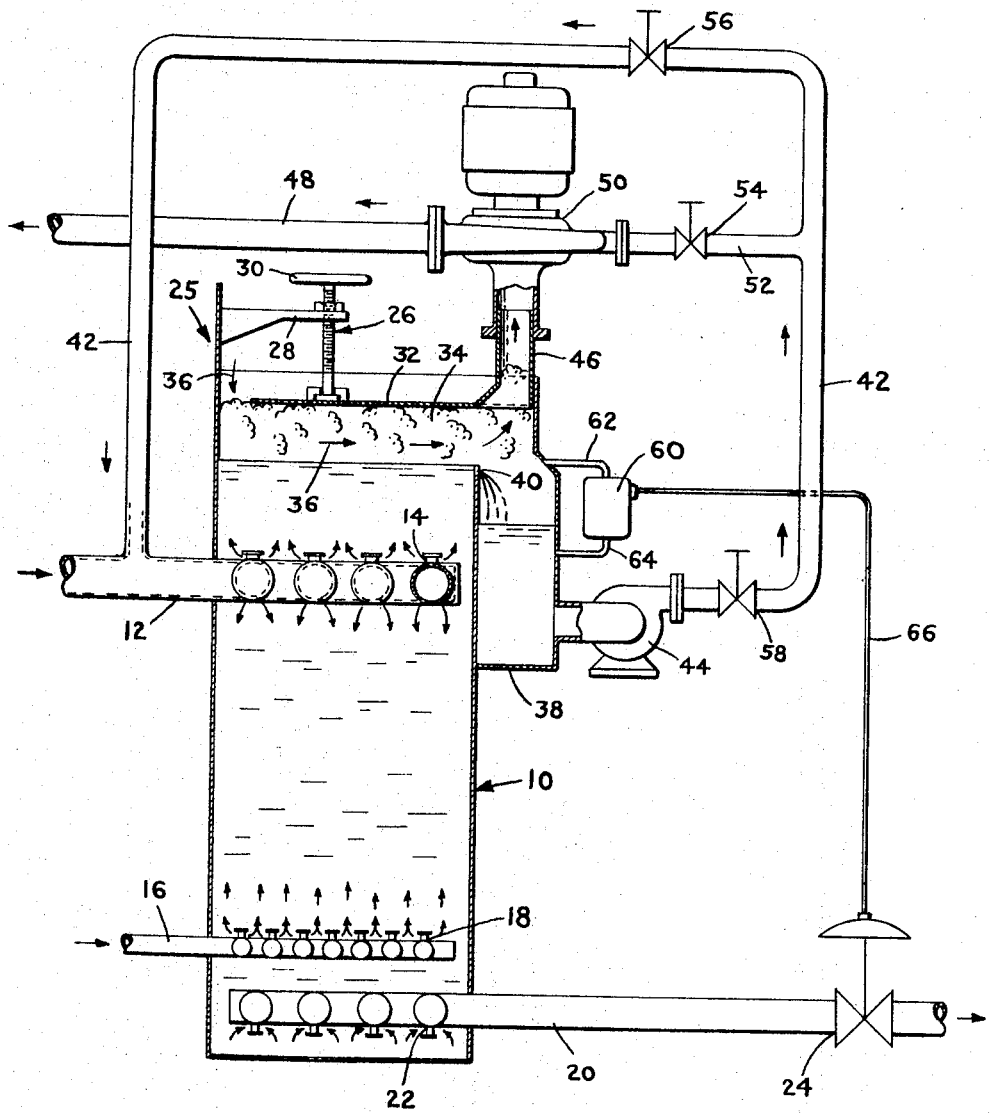
FIGURE 1 is a schematic diagram of a first embodiment of a foam removal system constructed in accordance with the teachings of our invention.

Referring now to FIGURE 1, a generally conventional foaming column is indicated generally at 10, and comprises a liquid inlet conduit 12 extending thereinto for the supply of a surfactant, or other foaming compound-laden, liquid thereto. To this effect, a plurality of spaced, liquid inlet means 14 are provided as shown on the said liquid inlet conduit 12 within the foaming column 10.

An air inlet conduit 16 extends as shown into the foaming column 10 in the vicinity of the bottom thereof, and includes spaced, air inlet means 18 positioned therein and oriented in the vertically upward direction relative to the foaming column 10 for the introduction of air bubbles to the liquid contained therein, which air bubbles will, upon the discharge thereof from the said air inlet means 18, rise through the liquid in the foaming column 10 throughout substantially the entire cross sectional area thereof to the top of the said foaming column to promote the foaming and separation of the said foaming compounds contained within the said liquid.

A liquid collection conduit 20 extends as shown into the foaming column 10 adjacent the bottom wall thereof, and includes spaced, liquid collection means 22 provided therein to enable the flow of liquid, from which substantially all of the foaming compounds have been separated within the foaming column 10, into the said liquid collection conduit for the removal thereof from the said foaming column. A power operated, flow control valve 24 is provided in the liquid collection conduit 20 for controlling the flow of the said liquid therethrough in a manner described in detail hereinbelow.

Foaming compound collection and removal means are indicated generally at 25, and comprise adjustable, secondary air velocity control means 26 positioned adjacent the top of the foaming column 10. The said air velocity control means include a frame member 28 which is supported as shown from an adjacent wall of the said foaming column, and an adjustment handle 30 which is screw threadably positioned within a bore provided therefor in the said support frame 28 to enable the vertical movement of the former relative to the latter upon the rotation of the said adjustment handle. A secondary air velocity control plate 32 supported as shown in any convenient manner from the lower extremity of the said adjustment handle and vertically movable therewith relative to the surface of the foam-laden liquid within the foaming column 10. The secondary air velocity control plate 32 extends as shown in a spaced, generally parallel manner relative to the said liquid surface, whereby may be readily understood that a fluid flow passage 34 is provided therebetween, the effective flow area of which is conveniently adjustable by vertical movement of the said secondary air velocity control plate relative to the said surface. A foam removal conduit 46 extends upwardly as shown from the fluid flow passage 34 to enable the removal of foaming compounds, in the foam state, from the latter.

A liquid collection chamber 38 is provided as shown to one side of the foaming column 10 adjacent the upper portion thereof, with the interior of the said liquid collection chamber being separated from the interior of the said foaming column by a weir 40 extending therebetween. Thus may be understood whereby the said weir in effect establishes the level of liquid within the foaming column 10.

A recirculation line 42 extends as shown from the lower portion of the liquid collection chamber 38 to the liquid inlet conduit 12, and includes a recirculation pump 44 connected therein for recirculating foaming compound-laden liquid from the liquid collection chamber 38 to the liquid inlet conduit 12 for purposes described in detail hereinbelow.

A liquified foam removal conduit 48 extends as shown into fluid flow communication with the foam removal conduit 46, and includes a centrifugal blower 50 positioned therein at the juncture thereof with the said foam removal conduit for the withdrawal of foaming compounds, in the foam state, from the latter, the collapse and attendant liquification of the said foaming compounds, and the supply thereof in substantially liquid form to the said liquid foam removal conduit 48. Non-illustrated, liquified foaming compound disposal means of any satisfactory design may be connected to the discharge end of the liquified foam removal conduit 48 for the disposal of the said liquified foaming compounds.

A flushing line 52 extends as shown from the recirculation line 42 to one side of the discharge of centrifugal blower 50, and normally closed flushing valve 54, and normally open flushing valve 56, are connected as shown in the respective flushing and recirculation lines.

A flow control valve 58 which may be either manually operated, or operated by suitable, non-illustrated float means positioned within the liquid collection chamber 38, is connected as shown in the recirculation line 42 upstream of the recirculation pump 44.

Automatic level responsive control means 60 of any suitable construction are connected through conduits 62 and 64 to the liquid collection chamber 38, and are also connected to the power operated, flow control valve 24 in liquid collection conduit 20 through control conduit 66 extending therebetween, whereby the level of liquid within the liquid collection chamber 38 may be maintained at a desired level by the said level control means through the control thereby of power operated, flow control valve 24 as should be obvious.

In normal operation of the foaming compound collection and removal system of the invention, for example in the removal of surfactants from treated sewage effluents, flushing valve 54 is closed and flushing valve 56 is open, and secondary air velocity control means 26 are adjusted to provide for the flow of secondary air through the fluid flow passage 34 at a desired velocity. Operation of the system is then commenced by the supply of the surfactant-laden liquid to the foaming column 10 through liquid inlet conduit 12, the supply of compressed air to the said foaming column through air inlet conduit 16, and the activation of recirculation pump 44 and centrifugal blower 50. Thus, surfactant-laden liquid will be discharged from the liquid inlet means 14 into the foaming column 10. The concurrent introduction of air bubbles to the foaming column through air inlet means 18 promotes the separation of the surfactants from the liquid by the travel of the said air bubbles to the top of the said foaming column as should be obvious.

Thus, a layer of surfactants, in the foam state, will collect within the fluid flow passage 34 atop the foaming column 10, be removed therefrom by the flow of secondary air therethrough as indicated by the arrows 36, and supplied with the said secondary air through foam removal conduit 46 to centrifugal blower 50, wherein the said surfactants will be collapsed and liquified for discharge from the system through liquid foam removal conduit 48.

Concurrently therewith, the portion of the liquid which collects at the top of the foaming column 10 and thus contains a higher percentage of surfactants than that contained in the liquid as initially supplied to the foaming column 10 through liquid inlet conduit 12, will overflow from the said foaming column over the weir 40 and flow therefrom into liquid collection chamber 38. The said liquid portion will then be pumped by recirculation pump 44 through recirculation line 42 and returned to the liquid inlet conduit 12 for the resupply thereof to the foaming column. The recirculation or refluxing of liquid with a higher than normal concentration of surfactants contained therein significantly increases the surfactant removal efficiency of the system by again subjecting this surfactant-laden liquid to the foaming action of the air bubbles from air inlet means 18.

As the substantially surfactant-free liquid settles to the bottom of the foaming column 10, the said liquid will flow through liquid collection means 22 into liquid collection conduit 20 and therefrom to any suitable, non-illustrated point of collection, reutilization or disposal thereof.

A level of liquid within foaming column 10 sufficiently above the weir 40 to enable the desired flow rate of the said liquid from the said foaming column to the said liquid collection chamber is maintained by the level control means 60 through the action of the latter on flow control valve 24. Thus, should the level of liquid within the liquid collection chamber 38 fall below a desired point, this condition will be sensed by level control means 60 and an appropriate signal conveyed therefrom through control conduit 66 to power operated, flow control valve 24 to cause the latter to temporarily decrease the flow rate therethrough, whereby the level of liquid within foaming column 10 will rise to result in increased liquid flow over the weir 40 into the liquid collection chamber 38 and the restoration of the liquid contained in the latter to a desired level.

Conversely, an increase in the level of liquid in the liquid collection chamber 38 beyond a desired point can be quickly corrected for through the action of level control means 60 in momentarily opening flow control valve 24 to a greater than normal extent to momentarily reduce the amount of liquid flowing over weir 40 into collection chamber 38 and thus restore the quantity of liquid contained in the latter to the desired level.

Periodic cleaning of the centrifugal blower 50 to flush out matter which may have deposited on the internal surfaces thereof may be conveniently effected by the opening of normally closed flushing valve 54, and the closing of normally open flushing valve 56, whereby liquid from liquid collection chamber 38 may be pumped by recirculation pump 44 through a portion of recirculation line 42 and flushing line 52 in reverse direction through the centrifugal blower 50 to effectively cleanse the latter.

Figure 2:
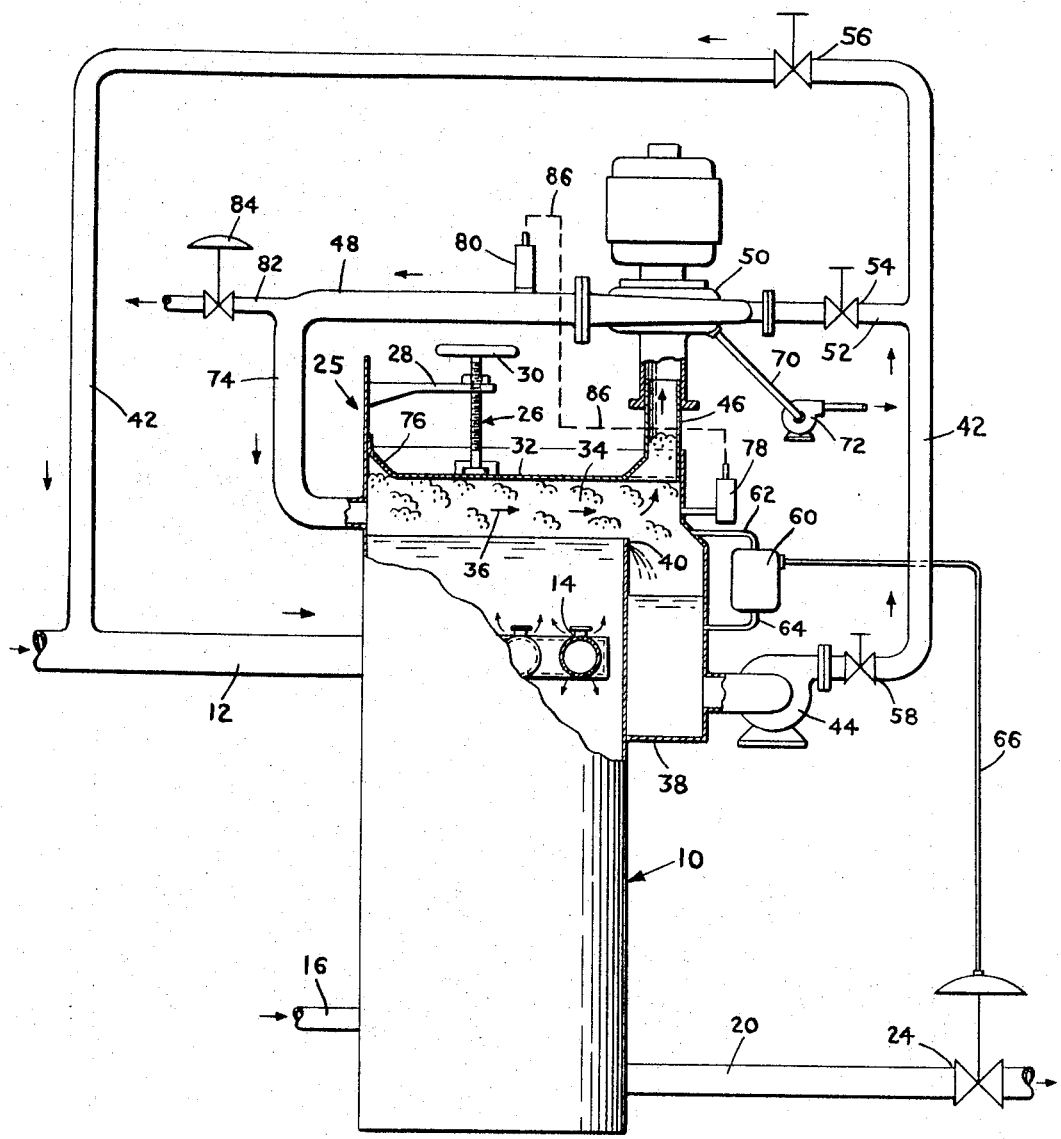
FIGURE 2 is a schematic diagram of a second embodiment of a foam removal system constructed in accordance with the teachings of our invention.

The embodiment of FIGURE 2 is of the same general construction as the embodiment of FIGURE 1, and like components accordingly bear the same identifying numbers in both of the said figures.

Referring now to the embodiment of the latter figure, the same comprises, in addition to the components of the embodiment of FIGURE 1, a collapsed, liquified foam removal conduit 70, of relatively small diameter, extending as shown from the casing of centrifugal blower 50 to enable the removal of collapsed foam therefrom. A collapsed foam transfer pump 72 of any suitable design is included as shown in the conduit 70 to promote the transfer of collapsed foam therethrough. Thus it may be readily understood that centrifugal blower 50 will, in the embodiment of FIGURE 2, function to supply substantially foaming compound-free air to conduit 48.

To this effect, and for purposes described in detail hereinbelow, an air recirculation conduit 74 is provided to extend as shown from conduit 48 through the adjacent wall of the foaming column 10 to place the former in fluid flow communication with the fluid flow passage 34 formed atop the liquid within the said foaming column by air velocity control plate 32 extending thereover. In addition, flange means 76 are provided on the said air velocity control plate and extend therefrom as shown in sliding contact with the adjacent foaming column wall to thus in effect provide a closed loop system and make possible the continuous recirculation of transport air from fluid flow passage 34 through conduit 46, blower 50, and conduits 48 and 74, respectively, back to the said flow passage.

Means in the form of adjustable air control valve 78 and adjustable air bleed control valve 80 are provided as shown to enable control of the temperature and velocity of the transport air independent of the flow area of flow passage 34 as explained in detail hereinbelow. The said valves 78 and 80 may be interconnected in any convenient manner, as indicated by dashed line 86 extending therebetween, to enable operation of the said valves in a complementary relationship. In addition, a discharge conduit 82, controlled by control valve 84 connected therein as shown, may be provided to enable the discharge of some of the transport air from conduit 48 to compensate for the air supplied to the system through air inlet conduit 16.

The foaming column, and liquid recirculation and blower flushing means operate in substantially the same manner in the embodiment of FIGURE 2 as described hereinabove with regard to the embodiment of FIGURE 1. In the latter embodiment, however, since a closed loop, transport air recirculation system is provided, the said transport air which functions to flow through flow passage 34 to collect the foam therein and transport it to the centrifugal blower 50, is rendered substantially foam free by the action of the said blower and collapsed foam removal conduit 70 connected thereto, whereby the said transport air may be readily and continuously recirculated through the flow passage 34.

The recirculation of the transport air is of significant advantage in preventing freezing in applications wherein the foam removal system is to be utilized outdoors under low ambient air temperature conditions, because the said recirculation provides sufficient heat of compression from the operation of blower 50 to maintain the transport air temperature above that at which freezing might occur in flow passage 34. Under extreme temperature conditions, supplementary heat may, however, be provided, in any convenient, non-illustrated manner, either to the transport air, or the liquid within the foaming column, to insure that freezing does not occur.

Assuming operation under below freezing ambient air temperature conditions, opening of air control valve 78 and air bleed control valve 80 will, of course, function to lower the temperature of the transport air by bleeding in cold air and discharging air warmed by the operation of the centrifugal blower 50, while closing of the said valves will conversely function to raise the said transport air temperature as should be obvious.

With regard to transport air velocity control across flow passage 34, opening of air bleed control valve 80 will reduce it by reducing mass flow through the said flow passage, while opening of air control valve 78 will increase transport air velocity by increasing mass flow through the said flow passage.

In addition to substantially eliminating the problem of freezing, the embodiment of FIGURE 2 provides further significant advantages through the confinement of odors which might ordinarily escape from the liquid being treated, and reduction in the noise level of operation of this system as should be obvious. With regard to the confinement of odors, it is to be understood that the transport air which escapes from the system through air bleed control valve 80 and/or discharge conduit 82 is of such relatively small quantity as to present no odor problem.

Gases other than atmospheric air may be supplied to the system of FIGURE 2 through inlet conduit 16 in any convenient, non-illustrated manner to provide either an oxidizing or reducing reaction with the compounds in the liquid to be processed by the foaming column 10. In such instances, valves 78 and 80 would be eliminated and non-illustrated means provided to extend from conduit 82 to enable the reclamation of the said gases and re-supply thereof to the foaming column 10 through inlet conduit 16.

It will be understood that the invention is not to be limited to the specific construction or arrangement of parts shown but that they may be widely modified within the invention defined by the claims.

What is claimed is:
1. In combination with a foaming column apparatus including a foaming column, means to introduce a liquid containing foaming compounds thereto, means to separate said foaming compounds from said liquid, and means to remove liquid from which said foaming compounds have been separated, the improvement of means to collect and remove foaming compounds separated from said liquid by said foaming column apparatus comprising:
  (a) pump means to collapse and remove foaming compounds transported thereto in the foam state;
  (b) fluid flow passage means communicating the top of said foaming column with the inlet of said pump means;
  (c) air inlet means in said fluid flow passage means to provide a flow of secondary air to the inlet of said pump means, said flow of secondary air to result in the collection and transportation of said foaming compounds, in the foam state, from the top of said foaming column to the inlet of said pump means; and
  (d) means to remove a portion of said liquid in which said foaming compounds have been concentrated by said foaming column and recirculate said portion through said foaming column by reintroduction thereof through said liquid introducing means so that said liquid portion will be resubjected to the action of said foaming column.

2. In a combination as in claim 1 wherein, said fluid flow passage means include adjustment means for adjusting the flow area thereof so that, the velocity of secondary air flowing therethrough to said pump means may be readily adjusted.

3. In a combination as in claim 1, wherein said means to remove a portion of said liquid in which said foaming compounds have been concentrated by said foaming column comprises:
  (a) liquid collection chamber means in fluid flow communication with the upper portion of said foaming column;
  (b) means placing said liquid collection chamber means in fluid flow communication with said liquid introduction means; and
  (c) control means cooperatively associated with said liquid collection chamber means and said foaming column apparatus liquid removal means, said control means constructed to control the rate of liquid flow through the latter in response to the level of liquid within the former.

4. In a combination as claimed in claim 3 wherein:
  (a) said means placing said liquid collection chamber means in fluid flow communication with said liquid introduction means comprises recirculating line means extending therebetween; and
  (b) recirculating pump means disposed in said recirculating line means to pump said liquid portion from said liquid collection chamber means to said liquid introduction means.

5. In a combination as in claim 4 further comprising:
  (a) flushing line means placing the outlet of the recirculating pulp means in flow communication with the outlet of the pump means;
  (b) a first valve means in the flushing line means;
  (c) a second valve means in the recirculating line means to control, in cooperation with said first valve means, the flow of liquid through said recirculating line means and said flushing line means so that fluid flow communication between said recirculation line means and said liquid introduction means may be prevented by the closing of said second valve means and said liquid portion flowed instead, in reverse direction, through said pump means by the opening of said first valve means and operation of said recirculation pump means to effectively cleanse foaming compound material which may have deposited in said pump means.

6. In a combination as in claim 1 wherein:
(a) a collapsed foam removal means is operatively associated with said pump means for removing collapsed foam therefrom; and
(b) said air inlet means comprises means connecting the outlet of said pump means with the inlet of said fluid flow passage means so that operation of said pump means will recirculate said flow of secondary air with said foaming compounds removed therefrom to the inlet of said fluid flow passage means.

7. In a combination as in claim 6 wherein, said fluid flow passage means include adjustment means for adjusting the flow area thereof so that the velocity of said air flowing therethrough to said pump means may be readily adjusted.

8. In a combination as in claim 6 further comprising, means to adjust the velocity and temperature of said air during the flow thereof through said flow passage.

9. In a combination as in claim 1 wherein:
(a) said pump means include collapsed foam removal means operatively associated with said pump means for removing collapsed foam therefrom;
(b) said air inlet means comprise means connecting the outlet of the pump means with the inlet of said fluid flow passage means so that operation of said pump means will recirculate said flow of secondary air with said foaming compound removed therefrom to the inlet of said fluid flow passage means;
(c) said fluid flow passage means include means to adjust the velocity and temperature of flow of secondary air through said fluid flow passage means;
(d) said means to remove a portion of said liquid in which said foaming compounds have been concentrated by said foaming column means includes:
 (1) liquid collection chamber means in fluid flow communication with the upper portion of said foaming column;
 (2) recirculating line means between the liquid collection chamber and said liquid introduction means;
 (3) control means cooperatively associated with said liquid collection chamber and said foaming column apparatus liquid removal means, said control means to control the rate of liquid flow through the latter in response to the level of the liquid in the former;
 (4) recirculating pump means disposed in said recirculating line means to pump said liquid portion from said liquid collection chamber means to said liquid introduction means;
 (5) flushing line means placing the outlet of the recirculating pump means in flow communication with the outlet of the pump means;
 (6) a first valve means in the flushing line means;
 (7) a second valve means in the recirculating line means to control, in cooperation with first valve means, the flow of liquid through said recirculating line means and said flushing line means so that fluid flow communication between said recirculation line means and said liquid introduction means may be prevented by the closing of said second valve means and said liquid portion flowed instead, in reverse direction, through said pump means by the opening of said first valve means and operation of said recirculation pump means to effectively cleanse foaming compound material which may have deposited in said pump means.

References Cited

UNITED STATES PATENTS

| | | | |
|---|---|---|---|
| 1,374,447 | 4/1921 | Greenawalt | 209—168 X |
| 1,915,436 | 6/1933 | Moore et al. | 55—169 |
| 3,018,843 | 1/1962 | Mercier | 55—178 |
| 3,169,841 | 2/1965 | Weis | 55—36 |
| 3,224,964 | 12/1965 | Derenk et al. | 55—178 X |
| 3,246,763 | 4/1966 | Baum | 210—221 |

REUBEN FRIEDMAN, *Primary Examiner.*

R. W. BURKS, *Assistant Examiner.*